(12) United States Patent
Yamaguchi

(10) Patent No.: US 7,660,465 B2
(45) Date of Patent: Feb. 9, 2010

(54) PATTERN RECOGNITION APPARATUS AND METHOD

(75) Inventor: Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 776 days.

(21) Appl. No.: 11/371,655

(22) Filed: Mar. 9, 2006

(65) Prior Publication Data

US 2006/0204079 A1 Sep. 14, 2006

(30) Foreign Application Priority Data

Mar. 10, 2005 (JP) ............................. 2005-067500

(51) Int. Cl.
*G06K 9/00* (2006.01)
(52) U.S. Cl. ..................................................... 382/181
(58) Field of Classification Search ...................... None
See application file for complete search history.

(56) References Cited

U.S. PATENT DOCUMENTS 5,638,465 A * 6/1997 Sano et al. .................. 382/281
6,642,929 B1 * 11/2003 Essafi et al. .................. 345/581
2003/0128876 A1 * 7/2003 Yamaguchi .................. 382/190

FOREIGN PATENT DOCUMENTS

JP 2003-242509 8/2003

* cited by examiner

Primary Examiner—Bhavesh M Mehta
Assistant Examiner—Alex Liew
(74) Attorney, Agent, or Firm—Turocy & Watson, LLP

(57) ABSTRACT

A pattern recognition apparatus compares an image including a photographed object to be recognized with a model previously registered in a table and recognizes the object to be recognized, and the pattern recognition apparatus includes an image input part 1, a feature point extraction part 2, a triangulation part 3, a feature point selection part 4, a basis calculation part 5, a partial pattern structure part 6, an index calculation part 7, a table registration part 8, a pattern similarity calculation part 9, a hypothesis information generation part 10, and an object recognition part 11. Plural feature points are extracted from the image of the object to be recognized, triangulation of a feature point set is obtained, and a combination of plural feature points is selected from plural feature points in accordance with the extracted triangulation.

19 Claims, 12 Drawing Sheets

FIG. 9
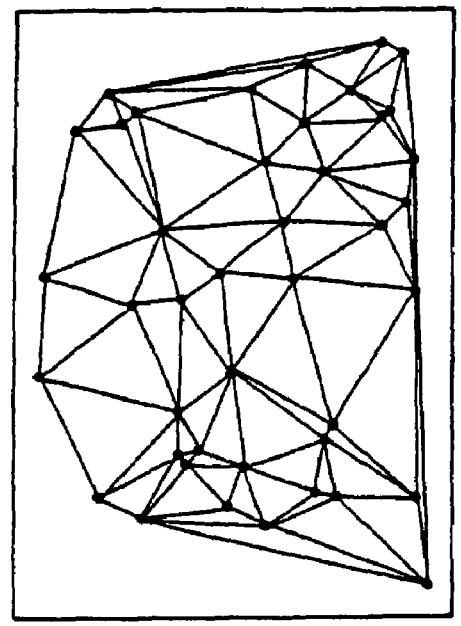
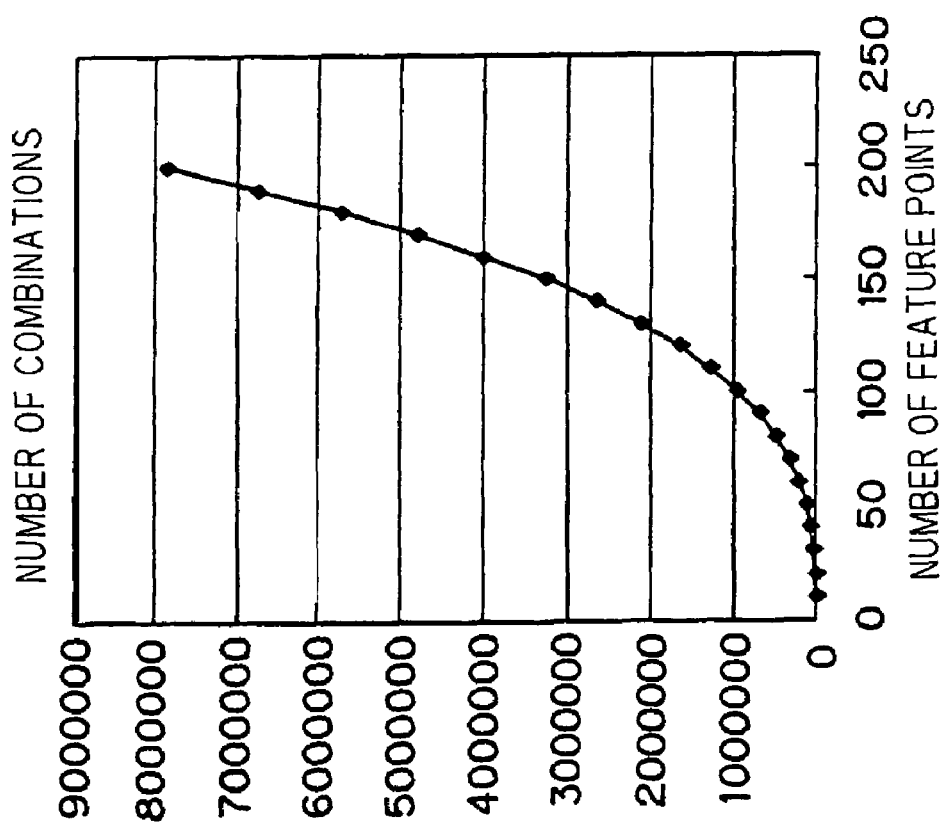

PATTERN RECOGNITION APPARATUS AND METHOD

CROSS-REFERENCE TO RELATED APPLICATIONS

This application is based upon and claims the benefit of priority from the prior Japanese Patent Application No. 2005-67500, filed on Mar. 10, 2005; the entire contents of which are incorporated herein by reference.

TECHNICAL FIELD

The present invention relates to a pattern recognition apparatus and method.

BACKGROUND OF THE INVENTION

A technique to detect and recognize the position, pose and shape of a specific object from an image is an important technique in computer vision. Japanese Patent Application Publication(KOKAI) No. JP-A-2003-242509 discloses a conventional pattern recognition method to recognize a registered object from an image.

This method has following properties in order to deal with partial occlusion.

The first property is to make the registration of partial information and the multiple description of a model.

The second property is to make the description of the model based on an invariant for not regulating the pose.

The third property is to enable the detection tolerance against noise.

This pattern recognition method is intended to perform object recognition and object extraction at high speed and with high accuracy by performing a distributed model representation of a partial image using a hash table for high speed retrieval of a partial template.

For registration and retrieval of partial information, a combination of three points is made for all of n image feature points to crop a partial pattern in accordance with basis vectors obtained by the combination of the three points.

However, in the above pattern recognition method, the order of the number of combinations of three feature points becomes O(n3), and there is a problem that when the number of feature points is increased, a long time and a large amount of memory for registration are required.

The left drawing of FIG. 9 is a graph of the number of combinations of three feature points and the number of feature points, and when the number of feature points is 200, the number of combinations reaches 8,000,000.

In view of speedup, in Japanese Patent Application Publication(KOKAI) No. JP-A-2003-242509, the following two methods are described.

The first approach is to adopt a technique to select feature points at random to substantially reduce the number of votes, as is adopted in Random Hough Transform.

The second approach uses various restrictions and limitations to the length, angle and the like of a vector constituting the basis information.

However, in the situation where the number of feature points becomes large, according to the first approach, a considerable number of votes are required in order to obtain sufficient accuracy. Besides, according to the second approach, there is a problem that an object in a specific direction can not be detected by the restrictions. Further, in these speedup approaches, it is not essential to reduce the number of combinations at the time of registration and is not satisfactory.

BRIEF SUMMARY OF THE INVENTION

According to embodiments of the present invention, a pattern recognition apparatus compares an image including a photographed object to be recognized with a previously registered model to recognize the object to be recognized, and includes an image input unit to input the image including the photographed object to be recognized, a feature point extraction unit to extract plural feature points from the image, a triangulation unit to divide the image into regions of plural triangles having vertices which are the plural feature points or vertices of a convex hull containing all the plural feature points, a feature point selection unit to select plural combinations of the feature points existing at the respective vertices of the respective triangles, a basis calculation unit to calculate, from the plural selected combinations of three feature points, bases (which is provided by two basis vectors) each indicating positions and a positional relation of the feature points, a partial pattern extraction unit to extract, from the image, a partial pattern of the object to be recognized corresponding to each of the bases, a table memory unit to store a table which includes plural registration places divided based on an index parameter including at least an invariant parameter with respect to a geometric transformation and in which a partial pattern of the model is registered at a registration place corresponding to the index parameter relating to the partial pattern, an index retrieval unit to determine a registration place of the table based on the index parameter corresponding to the partial pattern of the object to be recognized, and a pattern similarity calculation unit to calculate a similarity between the partial pattern of the model registered at the registration place of the table and the partial pattern of the object to be recognized.

According to embodiments of the invention, it is possible to improve the efficiency of the memory capacity and to speed up the retrieval. While the conventional property tolerance against occlusion and the like are kept, the efficient model search is performed and application to high speed retrieval becomes possible.

BRIEF DESCRIPTION OF THE DRAWINGS

FIG. 9 is a view showing an example of the number of combinations of three feature points and Delaunay triangulation.

DETAILED DESCRIPTION OF THE INVENTION

The conception of embodiments of the invention will be described.

From the viewpoint of object recognition, since a structural element of one object does not appear at a distant place, a combination of feature points may be limited to only points existing relatively closely to each other. Besides, it is desirable that the same combination can be generated for the same feature point set.

When consideration is given to a Voronoi tessellation in which with respect to a feature point set, division is made in each neighborhood region of the neighborhood point, there is a high probability that the same object exists in the neighborhood regions of a feature point.

Then, consideration is given to a Delaunay Triangulation as a dual graph thereof. In the Delaunay triangulation, triangles of relatively adjacent feature points are constructed. Further, it is known that the triangles by the Delaunay triangulation are constructed such that ones having obtuse angles are decreased.

Then, in the embodiments of the invention, the Delaunay triangulation is considered on a feature point set, and three points in accordance with the triangle are selected, so that the number of combinations is reduced, and feature point selection reflecting geometric peripheral information is enabled.

Hereinafter, based on this conception, the respective embodiments of the invention will be described with reference to the drawings.

First Embodiment

Hereinafter, a pattern recognition apparatus of a first embodiment of the invention will be described with reference to the drawings.

Figure 2:
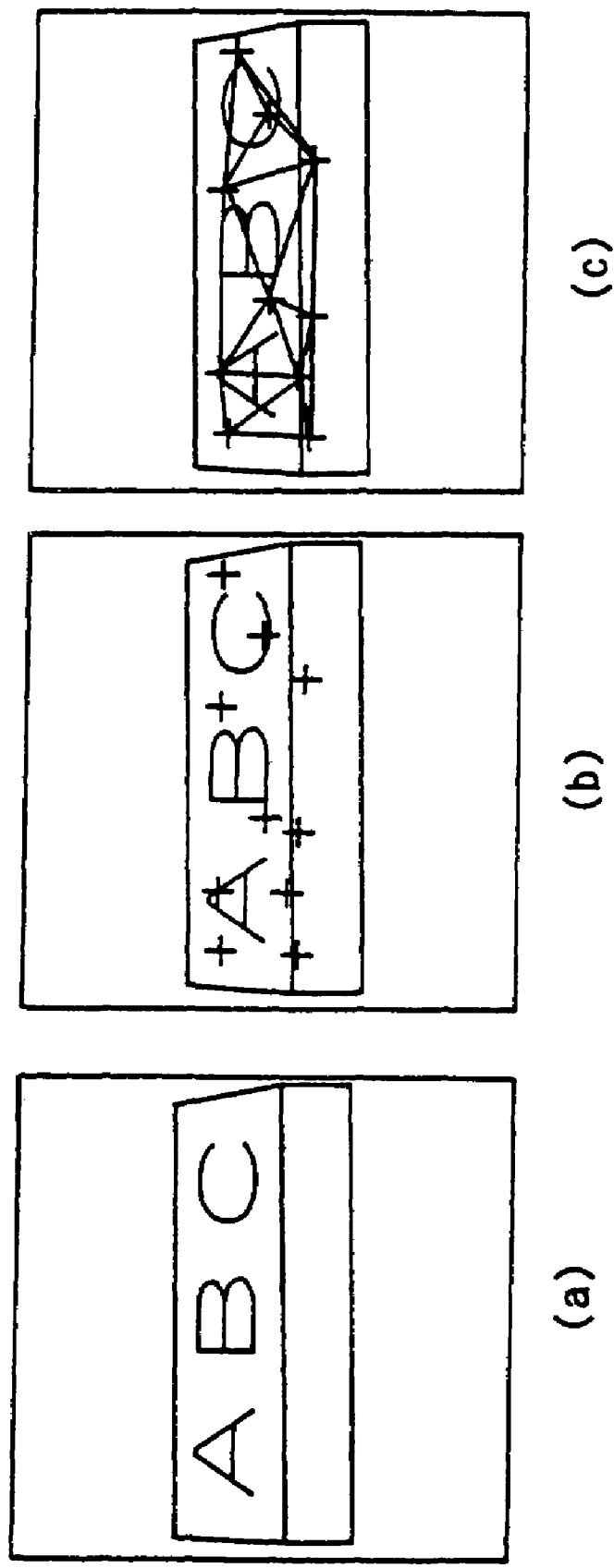
FIGS. 2A to 2C are conceptual views in which feature point detection processing and Delaunay triangulation are performed for a detection object (box).

This embodiment relates to a method of detecting the position and pose of an object from an image. Although any target object be adopted as an object to be recognized, in this embodiment, an example in which a box object as shown in FIGS. 2A to 2C is detected is used for the description.

In this embodiment, an image in which an arbitrary position and an arbitrary pose of the box are photographed is made one model, and images relating to boxes of various positions and poses are registered as plural models.

With respect to a detection object image in which the same box is photographed, it is judged that the image is similar to which model, and the position and pose of the box photographed in the detection object image are recognized.

Then, the following description is divided into two phases of; "registration of model" and "detection and identification of model by vote".

(1) Structure of Pattern Recognition Apparatus

Figure 1:
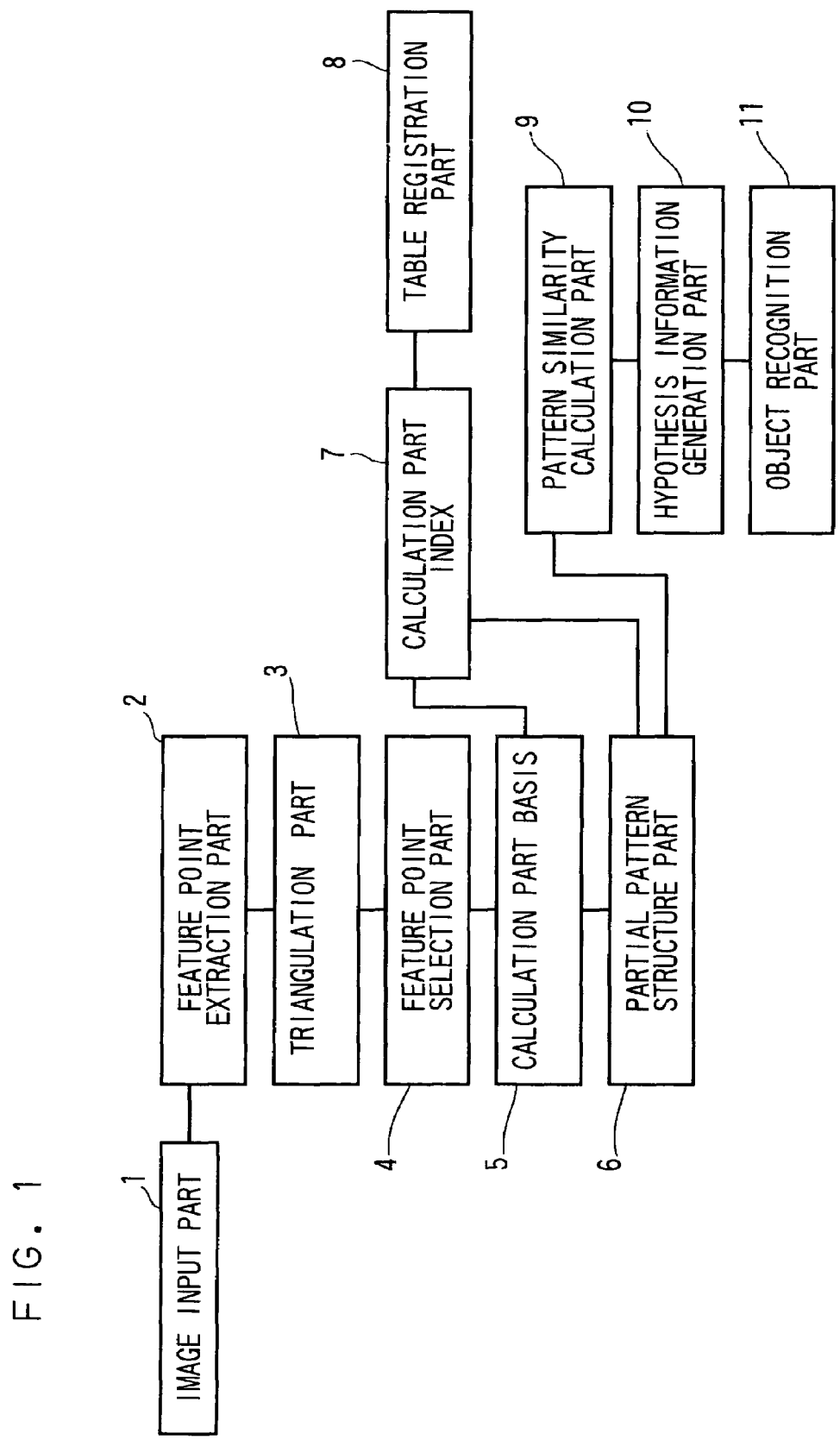
FIG. 1 is a structural view of an object recognition apparatus showing a first embodiment of the invention.

FIG. 1 is a structural view of a pattern recognition apparatus of this embodiment.

As shown in FIG. 1, the pattern recognition apparatus includes an image input part 1, a feature point extraction part 2, a triangulation part 3, a feature point selection part 4, a basis calculation part 5, a partial pattern structure part 6, an index calculation part 7, a table registration part 8, a pattern similarity calculation part 9, a hypothesis information generation part 10, and an object recognition part 11.

Among these, the image input part 1 includes a CCD camera, a scanner, a device to receive an image file existing on a disk or the Internet, or the like, and the respective functions of the feature point extraction part 2, the triangulation part 3, the feature point selection part 4, the basis calculation part 5, the partial pattern structure part 6, the index calculation part 7, the table registration part 8, the pattern similarity calculation part 9, the hypothesis information generation part 10 and the object recognition part 11 are realized by a program stored in a computer such as a personal computer.

(2) Registration of Model

A registration method of a model of an object to be recognized will be described with reference to FIGS. 1, 3 and 4.

(2-1) Flow of Processing of Model Registration

The flow of processing will be described with reference to a flowchart of FIG. 3.

(2-1-1) Image Input Part 1

Figure 3:
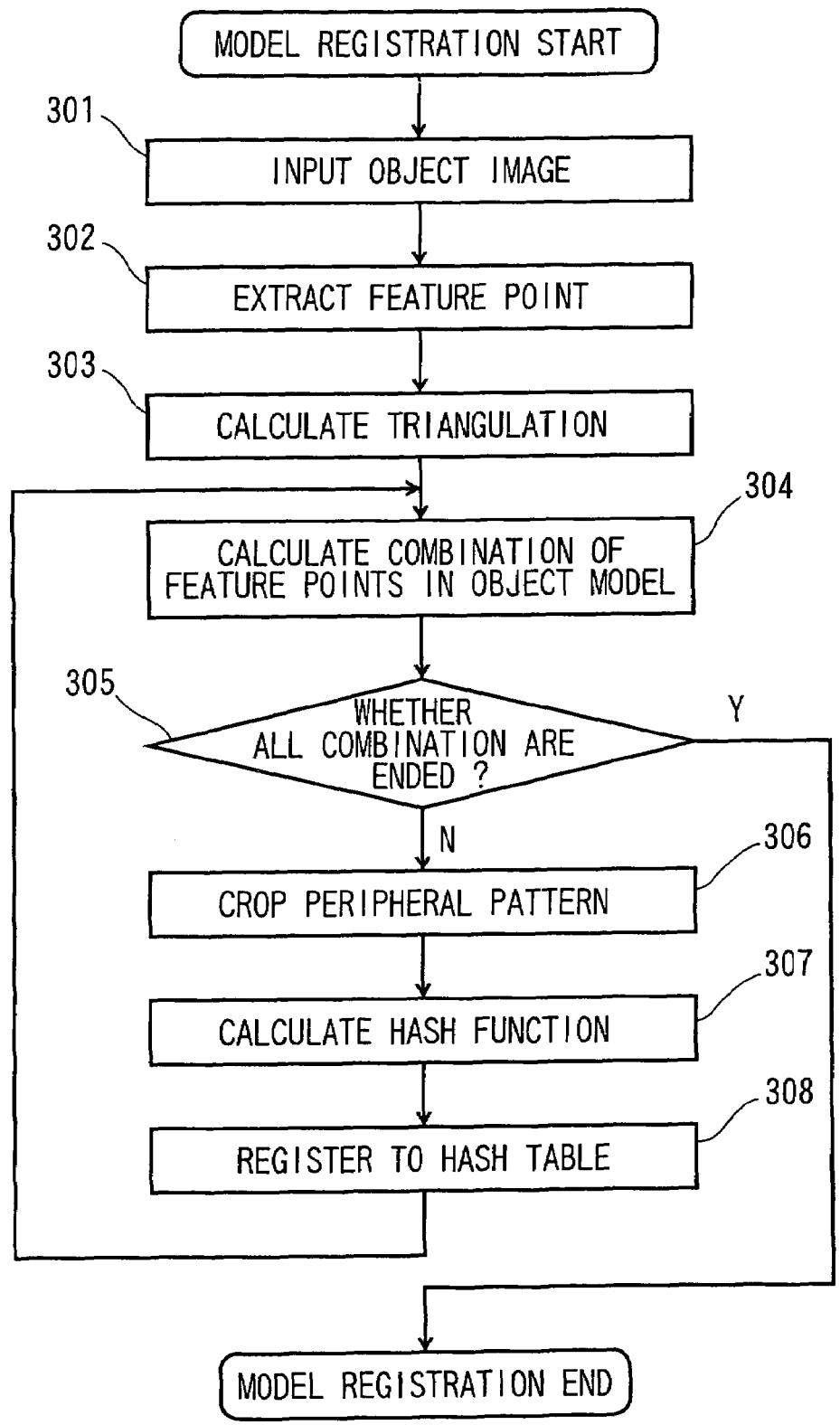
FIG. 3 is a flowchart of registration of a model.

First, in the image input part 1 of FIG. 1, an image including an object to be recognized is inputted (step 301 of FIG. 3).

(2-1-2) Feature Point Extraction Part 2

Next, in the feature point extraction part 2, feature points are detected for the image (step 302 of FIG. 3).

An example to detect the feature points is a corner (salient point) detector of HARRIS [C. J. Harris and M. Stephens, A combined corner and edge Detector. In Proc. 4th Alvey Vision Conference, Manchester, pages 147-151, 1988.]. Another example to detect the feature points is a separable filter of FUKUI [Kazuhiro Fukui, Osamu Yamaguchi: "FACE FEATURE POINT EXTRACTION BY COMBINATION OF SHAPE INFORMATION AND PATTERN MATCHING", IEICE Transaction (D-II), vol. J80-D-II No. 8 (1997)]. A method to detect the feature points may be selected according to the use and the object to be recognized.

(2-1-3) Triangulation Part 3

Next, in the triangulation part 3, triangulation to a feature point set is obtained. Here, as a method of the triangulation, the Delaunay triangulation as shown in the right drawing of FIG. 9 is used (step 303 of FIG. 3). In accordance with triangles generated in the triangulation, three points are selected in the next feature point selection part 4.

A description will be given to how the triangulation part 3 performs the Delaunay triangulation.

A convex hull is formed on a screen on which a model or an object to be recognized is photographed. This convex hull is formed so as to satisfy the following conditions.

First, in the case where the convex hull is formed for the model, as shown in FIGS. 2A to 2C, in order that this model is contained, the convex hull is formed while feature points of an image including the photographed model are made vertices. Then, all the detected feature points are made to exist in the inside of the convex hull or on its periphery. Incidentally, like a white ball, there is also an object having a possibility that the feature points can not be detected. At that time, tentative feature points (for example, four corner parts of the image) are forcibly made vertices, and the convex hull is formed.

Figure 10:
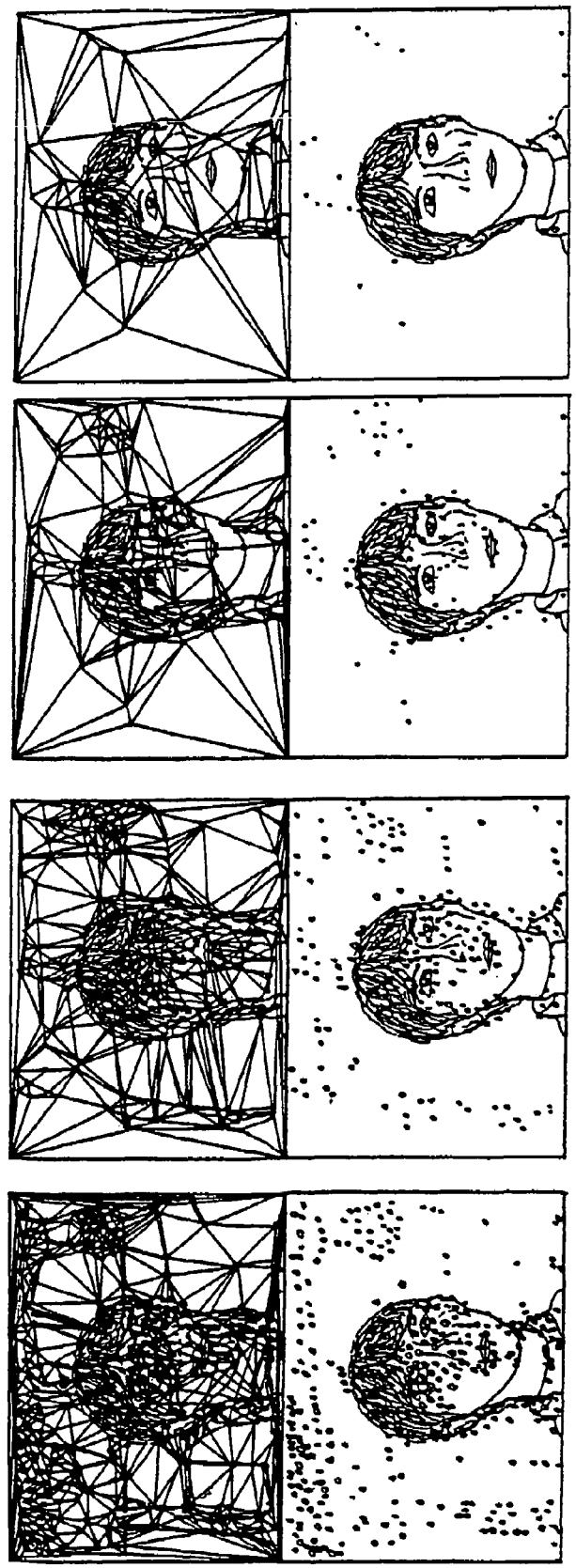
FIG. 10 is an explanatory view for obtaining triangulation in stages.

Besides, in the case where a convex hull is formed for an object to be recognized, as shown in FIG. 10, feature points of an image including the photographed object to be recognized, or other tentative feature points (for example, four corner parts of the image) are made vertices, and the convex hull is formed. All the detected feature points are made to exist in the inside of the convex hull or on its periphery.

In the Delaunay triangulation, plural triangles are obtained for all the feature points in the inside of the convex hull, and the triangles are divided so that a circumscribed circle of each of the triangles does not contain other feature points.

Then, a division is made into plural regions of the triangles having vertices which are the vertices of the convex hull formed as stated above or the plural feature points.

(2-1-4) Feature Point Selection Part 4

In the feature point selection part 4, feature points of the model or a portion including the object to be recognized are selected. Here, combinations of three points of the vertices of the generated triangles are obtained from the feature points (step 304 of FIG. 3).

(2-1-5) Processing after that

Then, registration of a partial pattern is performed for each of the combinations. In the basis calculation part 5, two vectors are determined from each of the combinations of three points, and by using basis information based thereon, a partial gray image pattern of a peripheral region is cropped in the partial pattern structure part 6 (step 306 of FIG. 3).

With respect to the cropped partial gray image pattern, a registration place is calculated in the index calculation part 6 by a hash function (step 307 of FIG. 3), and is registered in a hash table managed by the table registration part 7 (step 308 of FIG. 3).

By repeating this, at the time point when all combinations are obtained, the registration of one model is finished (step 305 of FIG. 3). In the case where plural models are registered, the above processing is repeated.

(2-2) Specific Example of Model Registration

A description will be given to a case where an image of FIG. 4-401 in which a box as a model object is photographed is registered.

Figure 4:
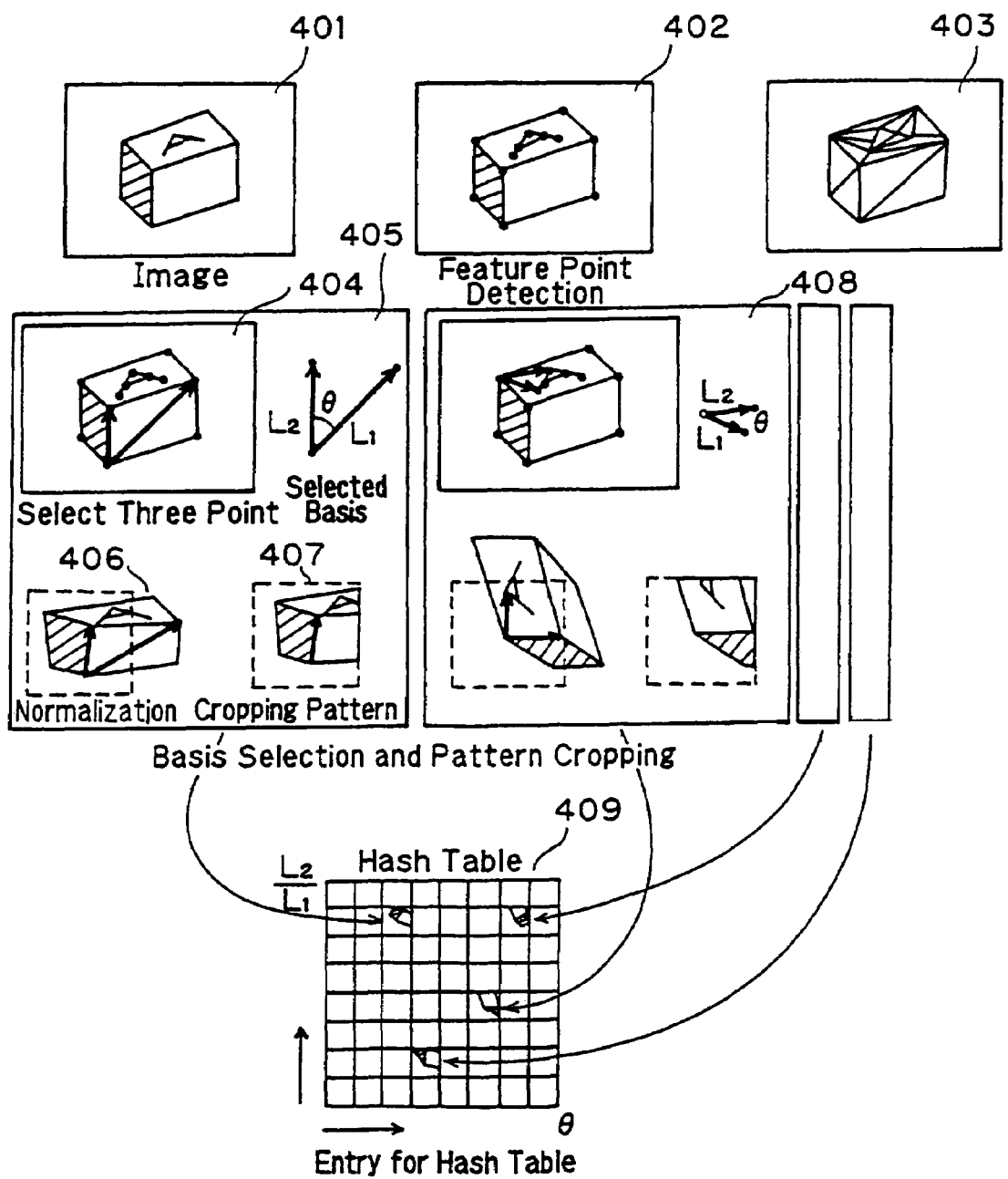
FIG. 4 is a view showing a registration method of a model.

The result of detection of feature points of the box as the model object is shown in FIG. 4-402. As shown in FIG. 4-403, Delaunay triangulation is obtained for these feature points.

Next, all combinations of three points of vertices of respective generated triangles are obtained. The combination of three feature points selected is called a feature point group.

FIG. 4-404 shows one feature point group among these feature point groups, and two reference vectors are obtained from the three feature points. FIG. 4-405 shows a basis spanned by two reference vectors, and lengths L1 and L2 of the two reference vectors and an angle θ therebetween are calculated.

Incidentally, the "basis" constitutes a coordinate system from some reference vectors, and has information of the origin and coordinate axes. Here, the start points of the two reference vectors are made the origin, and directions of the respective reference vectors are made directions of coordinate axes.

As the definition of a feature point group, in the case where a group is formed of feature points F1, F2 and F3, it is assumed that one in which the feature point F1 is the origin and one in which the feature point F2 is the origin form different groups. That is, there are six bases for one triangle.

Next, with respect to the basis, an image pattern of the periphery of the origin and the two reference vectors is cropped (FIG. 4-406). In the case where the cropping is performed, the coordinate system of the basis spanned by the two reference vectors is converted into the Cartesian coordinate system, and the image pattern is cropped.

In order to crop the image, the coordinate system of the basis spanned by the two reference vectors is converted into the Cartesian coordinate system. That is, the whole image is transformed so that the angle between the reference vectors becomes a right angle, and the lengths of the two reference vectors become equal to each other.

Thereafter, a gray image (image of m×n pixels) in a predetermined range with the origin of the basis as the center is cropped as a partial pattern.

The cropped gray image comes to have an invariant form with respect to various geometric transformations. As stated above, when the coordinate transformation is previously performed for the gray image, and registration and retrieval are performed, at the time of comparison between patterns, it becomes possible to judge the similarity without performing the geometric transformation to the gray image.

FIG. 4-407 shows the cropped partial gray image, and shows, in this embodiment, a square gray image.

There is a case where the cropped partial image is distortedly seen according to the length and direction of the reference vector.

FIG. 4-408 shows a case where the construction of a basis and the cropping of a partial pattern are similarly performed from a combination of different three points.

The respective cropped partial patterns are registered in specified registration places of a table (hereinafter referred to as a hash table) calculated by a hash function. The registration content may simultaneously include, in addition to the partial gray image, the kind of a saliency point, the relative position information of the partial pattern in the whole object to be recognized, and the like. This will be described later.

(2-3) Registration into the Hash Table

In this embodiment, with respect to a given basis, invariant to translation, rotation, scaling transformations is used as the property of the hash function. What has a basis of a certain identical condition defines a function which returns the same return value even if these transformations are applied.

Here, since an angle between two reference vectors constituting the basis and the ratio of the lengths of the two vectors are invariant with respect to the geometric transformations such as translation, rotation, scaling, the structure of the hash function using this invariant is considered. That is, the angle between the two reference vectors and the ratio of the lengths of the two vectors are made parameters (hereinafter referred to as index parameters) invariant with respect to the geometric transformation, and the registration place of the hash table is determined.

In the hash function H, as described below, three feature points p1, p2 and p3 are given as arguments, and after a ratio Raxs of lengths and an angle θaxs as the index parameters are obtained, they are quantized, and the position of the hash table is retuned. Here, the respective positions of p1, p2 and p3 are expressed with respect to the origin of the absolute coordinate system. Besides, the origin in the basis is made the feature point p1.

[Mathematical Expression 1]

$$H(p_1, p_2, p_3) = \{\theta_{axs}, R_{axs}\}$$

$$\theta_{axs} = \cos^{-1}\frac{(\vec{p_2} - \vec{p_1}, \vec{p_3} - \vec{p_1})}{|L_1||L_2|}$$

$$R_{axs} = \frac{|L_2|}{|L_1|}$$

$$L_1 = \|\vec{p_2} - \vec{p_1}\|$$

$$L_2 = \|\vec{p_3} - \vec{p_1}\|$$

FIG. 4-409 two-dimensionally shows the hash table, the vertical axis indicates the ratio Raxs of the lengths of the two reference vectors, and the horizontal axis indicates the angle θaxs formed between the two reference vectors.

Here, the angle θaxs between the two vectors obtained for each basis and the ratio Raxs of the lengths are obtained, and the cropped partial gray image pattern and the like are registered at the position of the hash table indicated by the value.

Incidentally, with respect to θaxs and Raxs, in view of an error, suitable quantization may be performed.

A substance (to be registered) on each hash table is expressed as follows. Incidentally, it is not limited to this form and the kind.

(Axs, Label, Inv, Rel, SPat, GPat, FeaPnt)[Mathematical Expression 2]

Where, "Axs" indicates coordinate system information based on three feature points. Specifically, it includes information of coordinate positions of the three points, two basis vectors and the like.

"Label" describes information indicating that each feature point is which detection point.

"Inv" indicates invariants with respect to transformation, and includes θaxs and Raxs indicated before.

Figure 5:
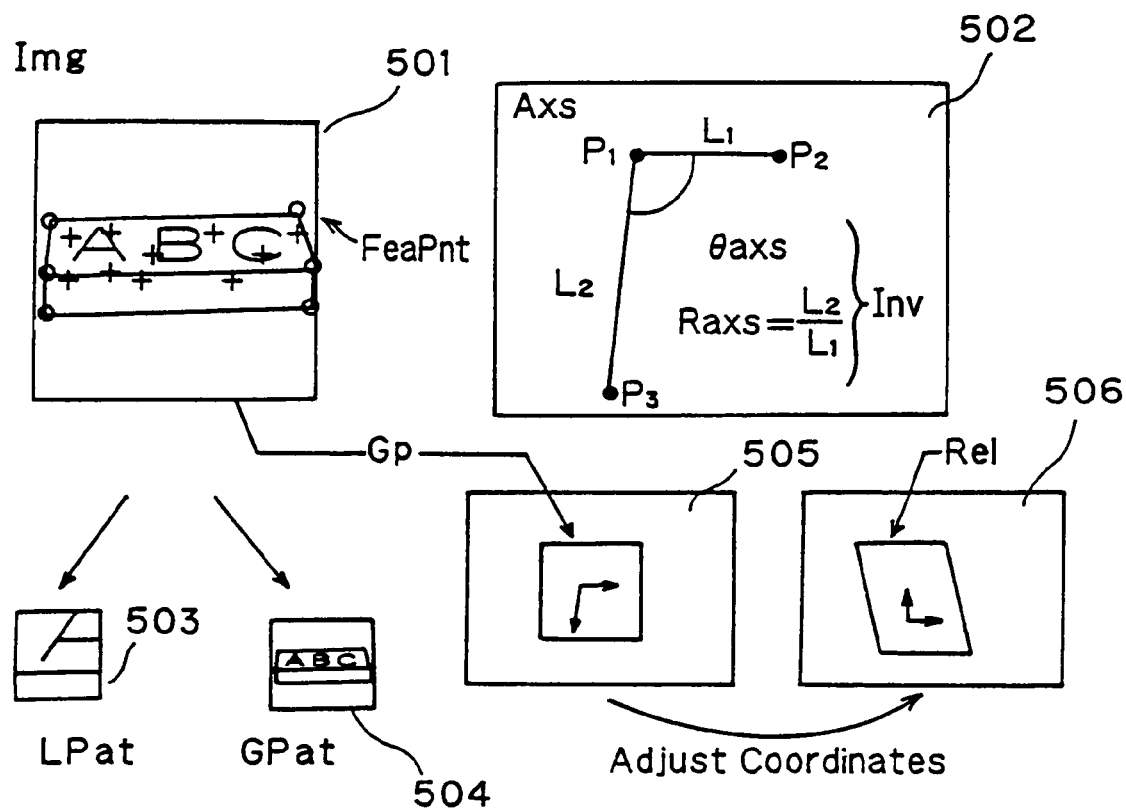
FIG. 5 is a view concerning registration information of partial pattern information.

"Rel" represents a point set expressing a rectangular region Gp surrounding a model relatively, and is used to indicate a place of a detection result and to extract the region again. As a specific example, four points of an vertex set to express the rectangular region Gp as shown in FIG. 5-505 are described by coordinate positions of four points of a transformed parallelogram as shown in FIG. 5-506.

"SPat" indicates a local image surrounded by feature points, and indicates a cropped partial gray image pattern.

"GPat" uses a global image, and for example, the image of the whole box as shown in FIG. 2A is used, and the matching result of the image is used.

"FeaPnt" describes information of a saliency point set different from the image feature points. The saliency point here indicates a characteristic point position on an object, and for example, in an example shown in FIG. 5-501, points of corners of the box are not detected as image feature points (cross marks in the drawing). Then, as shown in FIG. 5-501, points of saliency points (white circle marks in the drawing) are previously registered, and as relative position information described later, the positions of the corners of the box are stored as the saliency point positions. This is used to estimate the information of the characteristic place of the object from the saliency point position at the time of recognition. A similar processing is performed for all combinations, and the model is registered.

FIG. 5 shows various data.

FIG. 5-501 shows an image including a box. As the saliency points (FeaPnt), six points (corners of the box) are selected.

FIG. 5-502 shows a basis spanned by three points of the feature points (cross marks in the image), and an angle between the basis vectors and the ratio of lengths of the vectors are used as indexes of the hash table.

FIG. 5-503 shows a peripheral gray image pattern (LPat) cropped by the basis spanned by the three points.

In addition thereto, simultaneously, as shown in FIG. 5-504, the global gray image pattern (GPat) of the whole box region is also cropped.

Further, by the coordinate system generated by the basis information, the expression of a rectangle representing the whole region is changed from FIG. 5-505 to FIG. 5-506, and the relative coordinate Rel of the respective vertices is calculated. This is used to obtain how the relative position of the whole region changes in the case where it is detected.

In the registration of the model, not only the partial pattern (FIG. 5-503) is registered, but also the whole pattern (FIG. 5-504) and the relative coordinate position of the whole region shown in FIG. 5-506 are added.

In the recognition, the partial pattern is cropped similarly, and at the same time, it becomes necessary to crop the whole region. With respect to the selected basis information, the relative coordinate position of the whole region is calculated, the coordinate position on the actual image is obtained, and the gray image pattern of the region is used as the whole pattern candidate.

As a use method of the whole pattern, an example is given in which at the time of retrieval of models, in addition to the similarity between partial patterns, the result of calculation of similarity between the whole patterns is used.

Although the processing to one image has been described, when registration is similarly performed by using a different image of the same recognition object under a different photographing condition, it becomes possible to recognize the recognition object photographed in various environments.

In the hashing algorithm, in the case where registration is sequentially performed, and in the case where the value of the same hash function exists by a certain combination of three points, the partial pattern is registered at the same place. Thus, contrivance is made such that plural candidate patterns connected in list structure can exist at each position of the hash table.

(3) Detection and Discrimination of Model by Vote

Next, a method of detecting an object to be recognized from an image will be described.

In order to intelligibly explaining a detection algorithm of an object to be recognized, a division is made into selection of a model using the hash table, generation of hypothesis, integration of hypothesis and recognition by verification, and the description will be made.

(3-1) Selection of Model Using the Hash Table (3-1-1) Explanation of Selection Processing of Model The flow of the selection processing of the model using the hash table will be described with reference to FIG. 6.

Figure 6:
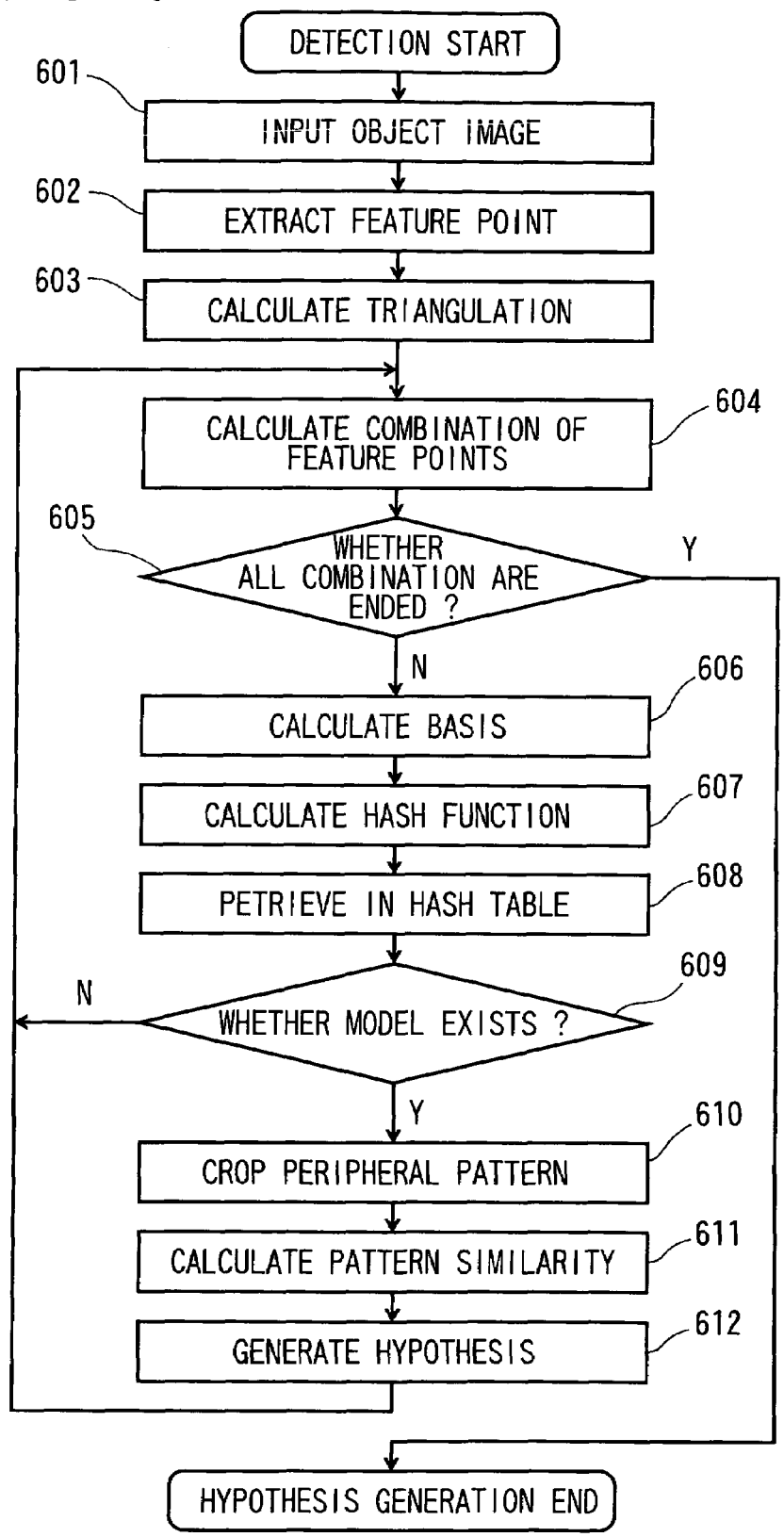
FIG. 6 is a flowchart of detection (generation of hypothesis information).

First, an image as an object to be recognized is read into the image input part 1 of FIG. 1 (step 601 of FIG. 6).

Next, in the feature point extraction part 2, extraction of feature points is performed for the image as the object to be recognized (step 602 of FIG. 6).

Next, from the detected feature points, in the triangulation part 3, the Delaunay triangulation of the detected feature points is obtained (step 603 of FIG. 6).

Next, with respect to the respective vertices of the generated triangles, in the feature point selection part 4, a combination of detected feature points is selected (step 604 of FIG. 6), and the processing is sequentially performed until all combinations are selected (step 605 of FIG. 6).

With respect to each of the combinations, a basis is calculated in the basis calculation part 5 (step 606 of FIG. 6).

An index parameter of the hash function at the basis is calculated in the index calculation part 7 (step 607 of FIG. 6).

In the table registration part 8, the registration place of the hash table corresponding to the index parameter is retrieved (step 608 of FIG. 6).

The judgment is changed according to whether the registration pattern exists (step 609 of FIG. 6).

In the case where the registration pattern exists, in the partial pattern structure part 6, a peripheral partial pattern is cropped, and the similarity between the registration pattern and the partial pattern is calculated in the pattern similarity calculation part 9 and is compared. Incidentally, with respect to the calculation method of the similarity between patterns, a calculation method of a similarity to a general gray image pattern, for example, normalized correlation, Sum of Squared Difference (SSD), or simple similarity may be adopted. Any method may be used for the similarity calculation between patterns.

In the case where the registration pattern does not exist, since there is no model, the calculation of the similarity is not performed (step 609 of FIG. 6).

After the selection of the model is performed, in the case where a partial pattern of a peripheral region of the combination of three points is similar, since there is a possibility that it is a part of the object region to be detected, in the hypothesis information generation part 10, hypothesis information of the detection object region is generated. This is performed on all the detected combinations of feature points, and the generation processing of the hypothesis information is repeated. This will be described later.

(3-1-2) Specific Example of the Selection Processing of Model

The procedure described until here will be specifically described with reference to FIG. 7.

The object of this processing is to detect, based on the inputted image, the position and pose of a box registered in the model registration described before.

Figure 7:
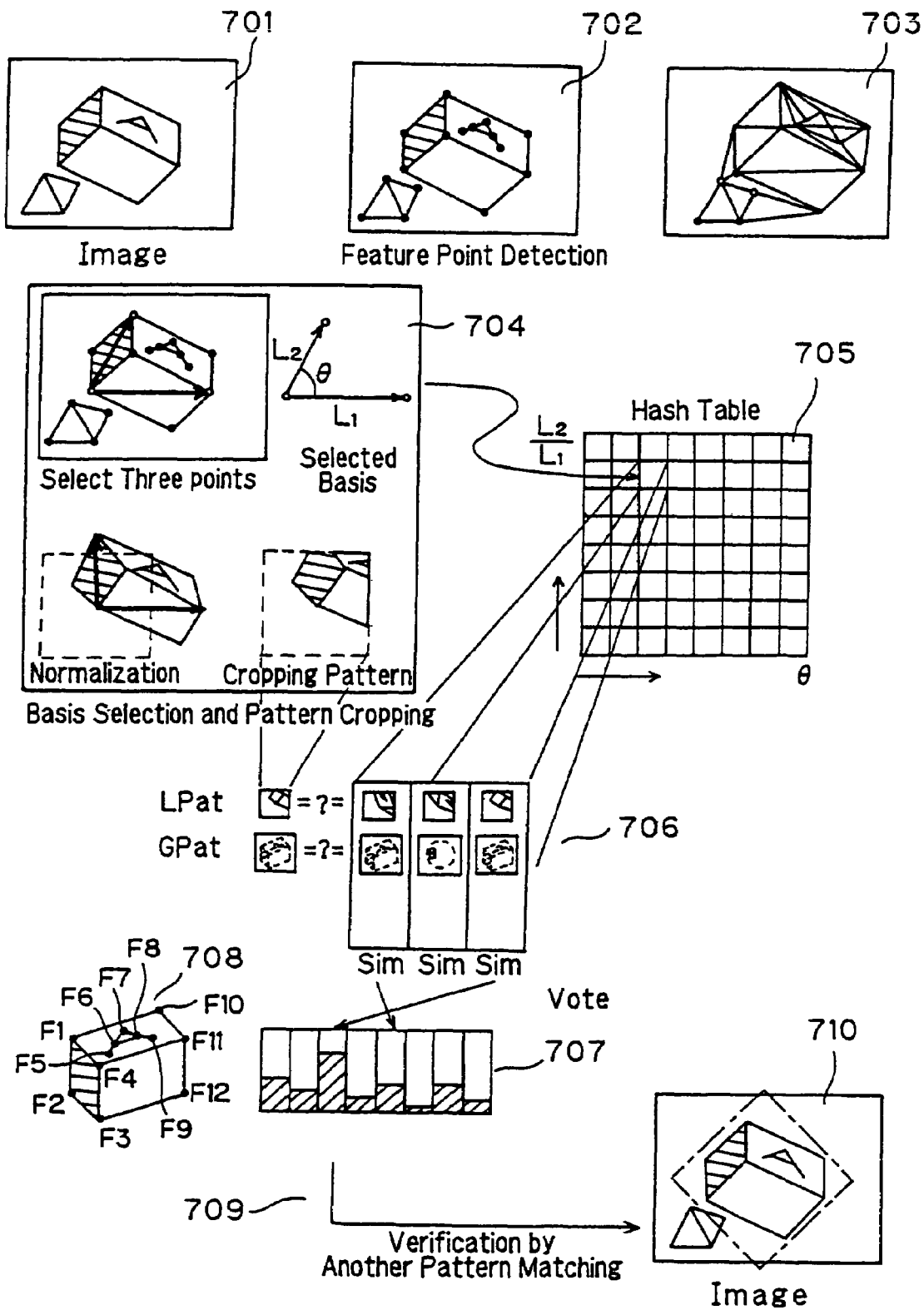
FIG. 7 is an explanatory view of a detection method.

FIG. 7-701 shows an input image in which the box as an object to be recognized is photographed. From this image, feature point detection is performed similarly to the model registration (FIG. 7-702).

Then, the Delaunay triangulation is obtained for the feature point set (FIG. 7-703).

Next, as in the model registration, in accordance with the triangulation, three points are selected from the feature points.

A gray image pattern of a peripheral region is cropped by the basis information generated based on the three points (FIG. 7-704).

Next, a place of a hash table (FIG. 7-705) corresponding to an invariant of basis information is retrieved.

In the case where the registration pattern exists and the similarity exceeds a specified threshold, hypothesis is generated.

As shown in FIG. 7-706, in the case where there are matching patterns, the respective hypotheses are generated.

(3-2) Generation of Hypothesis Information

The contents of the hypothesis information include a positional information of a feature point, information of a relative position and size, gray image pattern information, information of a similarity to a model pattern, and the like. As an example, a hypothesis H is defined by following five groups. Incidentally, the definition of the hypothesis information is not limited to this.

$$H=(TRel, TFeaPnt, Psim, Gsim, Rm) \quad \text{[Mathematical Expression 3]}$$

"TRel" denotes the position information in which the selected three feature points are converted in accordance with the relative position information Rel, and represents the existence region of the object to be recognized in the image.

"Psim" denotes the similarity between the gray image pattern registered as the model and the selected partial pattern.

"Gsim" denotes the similarity between the whole pattern cropped from the rectangle corresponding to TRel and the registered whole pattern.

"TFeaPnt" denotes the position information of a relative saliency point, and the details will be described in a third embodiment.

Incidentally, pattern information determined from three points selected in the detection process is expressed like following Rm similarly to that described in the hash table.

$$Rm=(Axs_x, Label_x, Inv_x, Rel_x, SPat_x, GPat_x) \quad \text{[Mathematical Expression 4]}$$

Besides, a partial model existing in a portion having the value of the same hash function is made $$(Axs_m, Label_m, Inv_m, Rel_m, SPat_m, GPat_m) \quad \text{[Mathematical Expression 5]}.$$

That is, since they exist at the same place as a result of retrieval, Invx=Invm is established. In order to generate the hypothesis information, respective elements are calculated by the following four functions.

$$TRel=FumcGeom(Axs_x, Rel_m)$$

$$Psim=FuncSim(SPat_m, SPat_x)$$

$$Gsim=FuncSim(GPat_m, GPat_x)$$

$$TFeaPnt=FuncPnt(TRel, FeaPnt_x) \quad \text{[Mathematical Expression 6]}$$

"FuncGeom" denotes a function to calculate an existence position of a object based on a selected basis. Specifically, it is calculated by the following expression. Here, (.,.) indicates a coordinate.

"FuncFea" denotes a function to calculate the position TFeaPnt of a saliency point on an input image. "FuncFea" will be described in the third embodiment.

$$Axs_x=\{(px_1, py_1), (px_2, py_2), (px_3, py_3), [Au, Av], [Bu, Bv]\} \quad \text{[Mathematical Expression 7]}$$

[Au, Av], [Bu, Bv] denote two basis vectors, and include three points $(px_1, py_1)$, $(px_2, py_2)$, $(px_3, py_3)$.

$$Au=(px_2-px_1), Av=(py_2-py_1)$$

$$Bu=(px_3-px_1), Bv=(py_3-py_1)$$

Besides, when $Rel_m=\{(rx_1, ry_1), (rx_2, ry_2), (rx_3, ry_3), (rx_4, ry_4)\}$ is indicated by four points to express a rectangle, $TRel=\{(px_1+rx_1Au+ry_1Bu, py_1+rx_1Av+ry_1Bv), (px_1+rx_2Au+ry_2Bu, py_1+rx_2Av+ry_2Bv), (px_1+rx_3Au+ry_3Bu, py_1+rx_3Av+ry_3Bv), (px_1+rx_4Au+ry_4Bu, py_1+rx_4Av+ry_4Bv)\}$.

"FuncSim" denotes a function to calculate a similarity between gray image patterns. The methods of obtaining the similarity between patterns include various ones as described before, and for example, a case of a simple similarity is calculated by the following expression.

$$SPat_m, SPat_x \text{ is a } k=(m \times n)\text{-dimensional vector,}$$

$$SPat_m=\{im_1, im_2, im_3 \ldots im_k\}$$

$$SPat_x=\{ix_1, ix_2, ix_3 \ldots ix_k\}$$

$$P_{sim}=(SPat_m, SPat_x)/\|SPat_m\|\|SPat_x\| \quad \text{[Mathematical Expression 8]}$$

Incidentally, $\|.\|$ denotes the norm of a vector.

The contents of respective hypotheses are calculated based on the contents of the partial models registered in the respective hash tables. Incidentally, The usage which generates all the information on hypothetical also about a partial model with low similarity value may be adopted.

Since each piece of hypothesis information has information as part of a detection object region, the object can be recognized by integrating these pieces of information.

(3-3) Recognition by Integration and Verification of Hypothesis Information

The hypothesis information as part of the detection object region is generated using the similarity of the partial pattern as described before, all pieces of hypothesis information are voted to the hypothesis space, and the results are integrated. This is processed in the object recognition part 11.

In this embodiment, a description will be given to a detection method in which a place of a saliency point set at the time of registration of a model can be specified.

(3-3-1) Specific Example of Hypothesis Vote Processing

The hypothesis space for voting the hypothesis information is managed by a hypothesis integration part included in the object recognition part 11. FIG. 7-707 schematically shows the hypothesis space. In FIG. 7-708, the hypothesis space includes respective hypothesis vote boxes corresponding to the pose, position and the like of each object to be detected.

With respect to the hypothesis in the case where three points shown in FIG. 7-704 are selected, about the partial pattern LPat which each hypothesis has, and the global pattern GPat; similarities Psim and Gsim of pattern matching with a pattern which are registered into the table are calculated. One in which both of them or only one conditionally exceeds the specified threshold is treated as a hypothesis to be voted.

In FIG. 7-706, although three partial patterns are retrieved, it is assumed that only two patterns exceed the pattern threshold, and only pattern similarity values are voted to the corresponding hypothesis vote boxes. Here, the similarity value indicated by Gsim is added. The vote is performed with respect to all pieces of hypothesis information relating to all combinations.

Next, it outputs the coordinates value of each feature point, in order of measurement of number of votes obtained or voting score, out of the combinations which have been accessed as high in term of the voting score (FIG. 7-709).

With respect to this, processing may be made such that a threshold is set and outputting of the coordinates values is made only for the feature points that have shown the voting score higher than the threshold. At this time, calculation is made as to where the position of the whole pattern exists and it may be made an output (FIG. 7-710). In this case, the result of the combination with the information of TRel indicating the existence position of the object may be used.

(3-3-2) Explanation of Hypothesis Vote Processing

Figure 8:
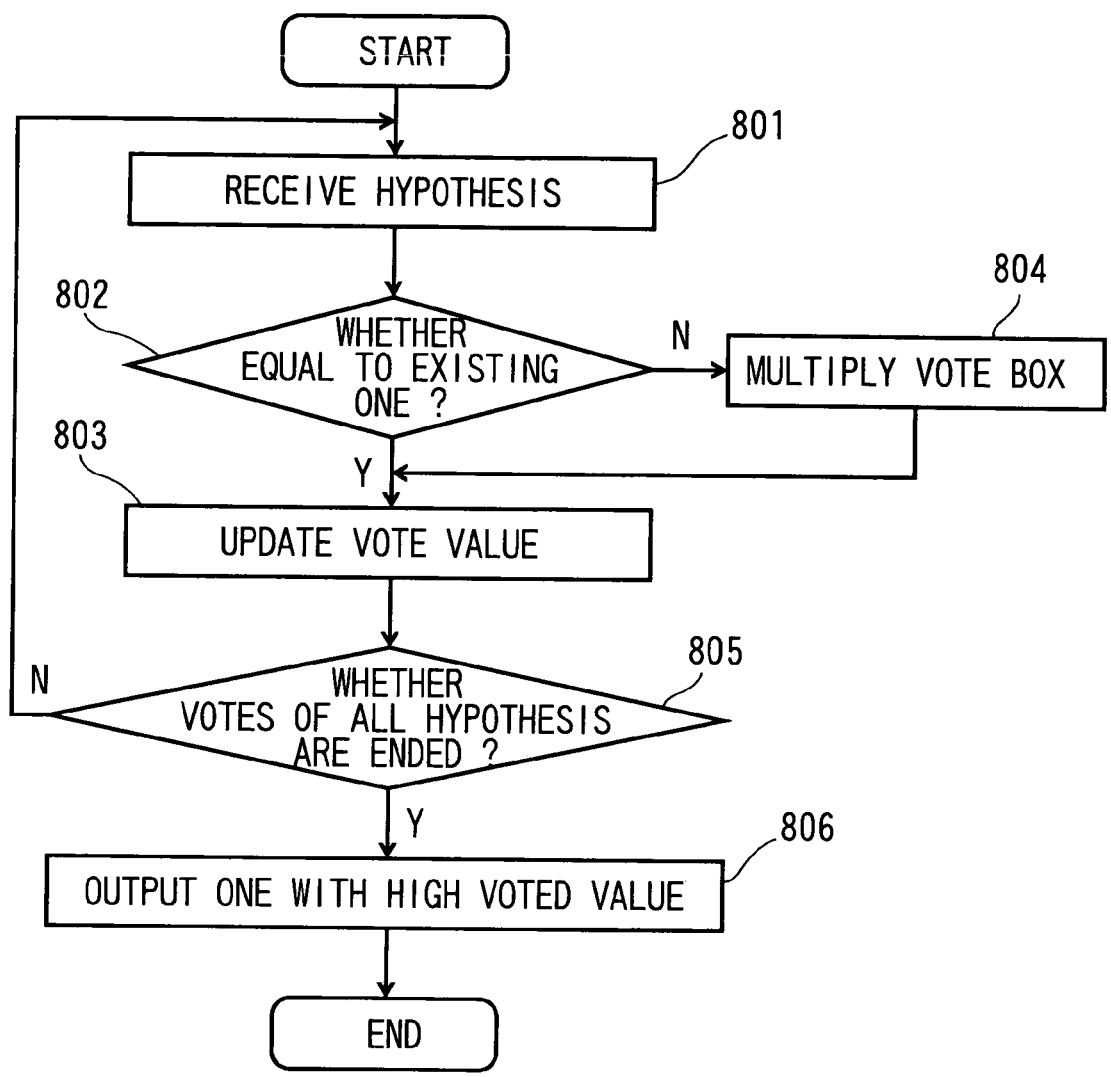
FIG. 8 is a flowchart of integration.

FIG. 8 shows a processing flowchart of the hypothesis integration part.

At step 801 of FIG. 8, when one piece of hypothesis information is received, it is checked whether there is a hypothesis vote box corresponding to the position of TRel calculated with the hypothesis information (step 802 of FIG. 8). In the case where the same hypothesis exists, the previously obtained similarity is added to the vote value of the hypothesis vote box to update the vote value (step 803 of FIG. 8). In the case where the same hypothesis does not exist, since the coordinate as the result is different, a different hypothesis vote box is prepared (step 804 of FIG. 8), and the similarity is added to start update. It is judged whether the vote of all pieces of hypothesis information is ended (step 805 of FIG. 8), and when not ended, the vote of the hypothesis information is repeated.

In the case where ended, the hypothesis having a high voted value is outputted from the vote values of the respective hypothesis vote boxes, and is made the detection result (step 806 of FIG. 8). Besides, when an identification label is attached to the registered object, it is possible to find what the detected object is.

Second Embodiment

A second embodiment will be described.

Although the number of combinations can be reduced by using the Delaunay triangulation, it is difficult to detect plural objects that differ in size from each other, in view of the property of the Delaunay the Delaunay triangulation; only vicinity triangles are generated from the property of the Delaunay triangulation. In order to further improve the accuracy, consideration is given to a case where various scale triangles are generated. Here, plural feature point sets are formed, and by changing the way of forming them, various scale triangulations are generated.

(1) First Method

A description will be given to a first method of generating various scale triangulations.

First, the feature point detection is made by the feature point extraction part 2 to generate a feature point set. At each of the feature points, there is something like an evaluation value by the feature point extraction part 2. For example, in the case of the corner detector of HARRIS, a value to indicate the degree of the corner is made the evaluation value, or in the case of the separable filter of FUKUI, the separable degree is made the evaluation value. The evaluation value is recited in Label.

Next, with respect to the evaluation value, plural thresholds are set. When the case of the separable degree is used as an example, since the value which the separable degree can take is 0.00 to 1.00, when the threshold is taken at intervals of 0.33, three-stage thresholds of 0.66, 0.33 and 0.00 are formed.

With respect to the previously obtained feature point set, a partial feature point set including only feature points not smaller than the threshold is generated. At this time, the partial feature point set with a smaller number of feature points is formed in descending order of the threshold. When the threshold is suitably changed, three-stage feature point sets having an inclusion relation are formed. When the Delaunay triangulation is obtained for each of the three feature point sets, sets of triangles different in size are generated.

More stable recognition can be performed by voting all of the multi-stage generated sets of three feature points as stated above. Although the integration processing may be performed after the votes of combinations of all triangles at all stages are performed, the integration processing may be performed at each stage.

Alternatively, coarse-to-fine processing may be performed in which after processing is performed at a stage, processing at a different stage is performed for a place which can be a candidate region.

(2) Second Method

A description will be given to a second method of generating various scale triangulations.

As the second method, multi-stage triangulations can be generated by changing a parameter of feature point detection.

FIG. 10 shows examples of four-stage feature point sets obtained by changing the parameter of the corner detector of Harris. The feature point detection processing is performed on a face image, the lower part thereof indicates the detection results of feature points, and the upper part thereof indicates the results of the Delaunay triangulation. This figure shows that triangles different in size are formed by changing the parameter.

Processing subsequent to this is similar to that of the first method.

Third Embodiment

Although the recognition results of the first and the second embodiments relate to only the position and pose of the object, a method of obtaining a place of a saliency point of a recognized object will be described. A saliency point estimation part having the following function is added to the object recognition part 11.

For example, when a description is made by use of FIG. 5-501, the saliency point is the corner part of a box and is a point indicated by a white circle mark.

(1) Operation of Saliency Point Estimation Part

The operation of the saliency point estimation part will be described.

(1-1) Registration of Saliency Point of Model

First, a saliency point of a model is registered. The saliency point of the model is registered in FeaPnt as the point different from the feature point at the time of registration of the model. For example, in the example of FIG. 5-501, in the case where the box is registered as the model, the point of the corner of the box different from the feature point (cross mark in the drawing) of the image is registered as the saliency point (white circle mark in the drawing).

Figure 11:
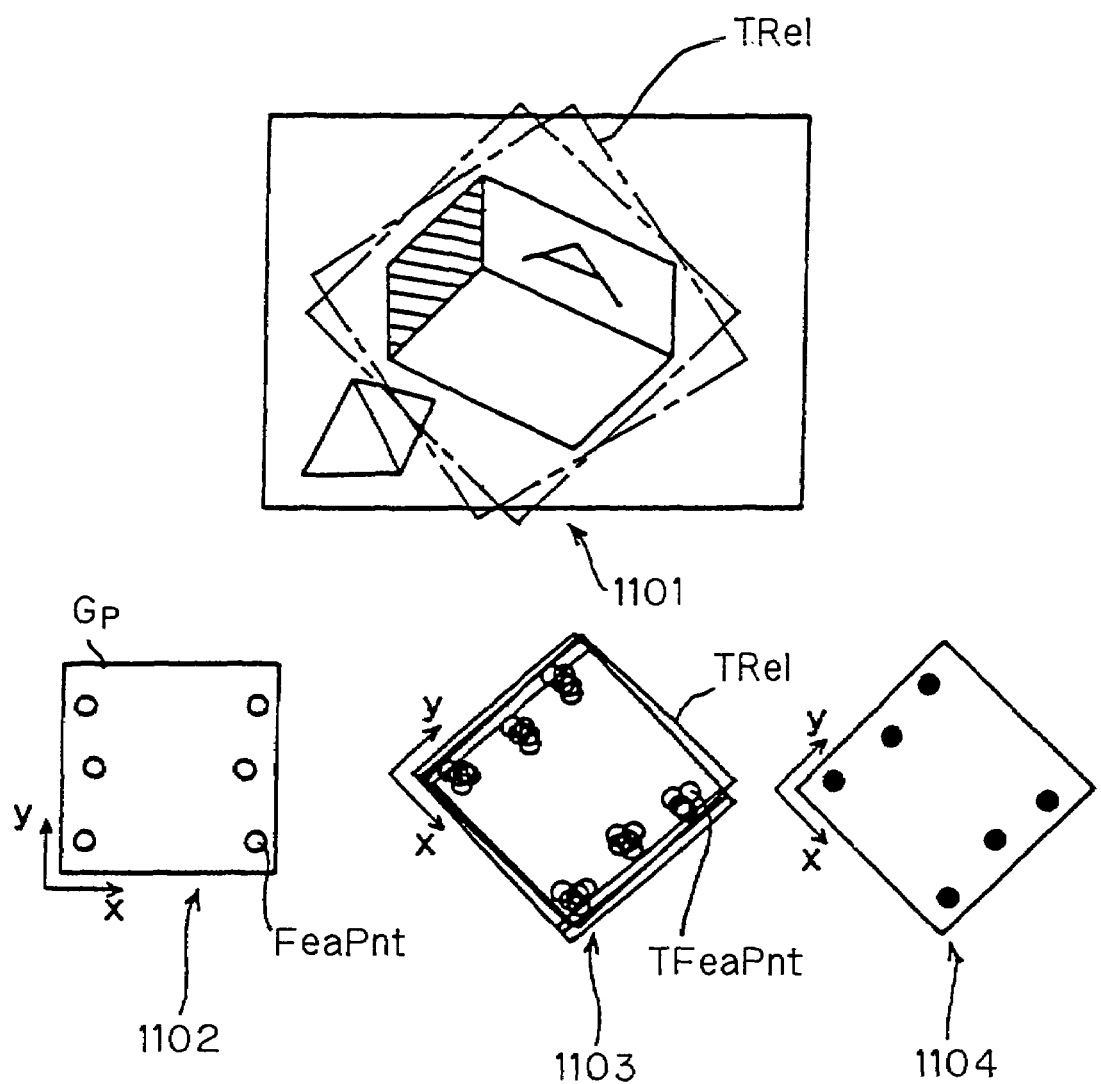
FIG. 11 is an explanatory view relating to estimation of saliency points.

FeaPnt holds relative position information to each point with respect to the rectangle of the whole image. A local coordinate system as shown in FIG. 11-1102 is used, and the respective points are described. Here, (px1, px1) (px2, px2) . . . are coordinate positions of the saliency points of the model in the local coordinate system. The local coordinate system is defined with respect to the whole rectangle, the coordinate to the lower side of the rectangle is made the x axis, the coordinate to the left side of the rectangle is made the y axis, and the position is described.

$$\text{FeaPnt} = (P_{x1}, P_{y1}), (P_{x2}, P_{y2}), (P_{x3}, P_{y3}), \ldots, (P_{xn}, P_{yn})$$ [Mathematical Expression 9]

(1-2) Recognition of Saliency Point of Object to be Recognized

Next, the recognition of a saliency point of an object to be recognized will be described.

As a result of the vote of the hypothesis performed in FIG. 7-707, plural (k) hypotheses are voted in the hypothesis vote box as the recognition result.

FIG. 11-1101 shows a state of detection of a box, and a rectangle TRel of each dotted line in the drawing corresponds to one voted hypothesis, and in order that an object (box) to be recognized is detected, plural rectangles are drawn at the same position and pose.

FIG. 11-1102 shows the saliency points FeaPnt of the model, and there are six points in the rectangle Gp in the drawing.

FIG. 11-1103 shows the saliency points TFeaPnt of the object to be recognized, and there are six points in the rectangle TRel in the drawing. However, since plural hypotheses Hi exist, and the rectangle TRel and the saliency point TFeaPnt of the object to be recognized exist for each of the hypotheses Hi, a shift appears in the figure.

Now, one hypothesis is made Hi (1=<i=<k).

$$\text{Hi} = (\text{Axs}_{Hi}, \text{Label}_{Hi}, \text{Inv}_{Hi}, \text{Rel}_{Hi}, \text{SPat}_{Hi}, \text{GPat}_{Hi}, \text{FeaPnt}_{Hi})$$ [Mathematical Expression 10]

In each hypothesis Hi, as indicated by mathematical expression 10, the coordinate position FeaPnt of the saliency point of the model is described, and is included in voted information. In each hypothesis Hi voted, the way of obtaining the position of the saliency point of the object to be recognized in the inputted image will be described.

(1-2-1) Recognition of Saliency Point of Object to be Recognized for Each Hypothesis The saliency point of the object to be recognized is obtained for each hypothesis Hi.

Consideration is given to the correspondence between the coordinate position to each model of FIG. 11-1102 and the coordinate position of the object to be recognized in the inputted image of FIG. 11-1103. The saliency point position TFeaPnt of the object to be recognized is calculated as the rectangle obtained in TRel, that is, the relative position to the rotated rectangle here.

The rectangle TRel on the input image as indicated in mathematical expression 9 is calculated using the rectangle Rel indicating the whole region of each model. In accordance with this, the position TFeaPnt of the saliency point of the object to be recognized on the actual input image is calculated from FeaPnt by the calculation expression indicated by mathematical expression 11.

"FuncFea" denotes a function to calculate the position of the saliency point on the input image.

Besides, reference characters used in mathematical expression 11 will be described again.

"TFeaPnt" denotes the position of the saliency point of the object to be recognized on the input image as stated above.

"FeaPnt" denotes the position of the saliency point of the model on the image as stated above.

"Rel" relatively represents a point set to express the rectangular region Gp surrounding the model as stated above, and is used to indicate the place of a detection result or to extract the region again. As a specific example, four points of a vertex set to express the rectangular region Gp as shown in FIG. 5-505 are described by coordinate positions of four points of a parallelogram converted as shown in FIG. 5-506.

"TRel" denotes position information obtained by changing Rel as the relative position information in accordance with the feature points of the selected three points, and indicates the existence region of the object to be recognized in the image.

$$\text{TFeaPnt} = \text{FuncPnt}(\text{TRel}, \text{FeaPnt}_x)$$

$$\text{TFeaPnt} = (\text{tp}_{x1}, \text{tp}_{y1}), (\text{tp}_{x2}, \text{tp}_{y2}), (\text{tp}_{x3}, \text{tp}_{y3}), \ldots, (\text{tp}_{xn}, \text{tp}_{yn})$$

$$\text{TRel} = (T_{x1}, T_{y1}), (T_{x2}, T_{y2}), (T_{x3}, T_{y3})$$ [Mathematical Expression 11]

The ith point $(\text{tpx}_i, \text{tpy}_i)$ of the point TFeaPnt on the image of the ith point $(\text{px}_i, \text{py}_i)$ of FeaPnt written in the local coordinate system is expressed by the following expression.

Lv, Lh correspond to a basis vector with respect to the rectangle of the image.

$$\vec{L_v} = (Tx_3 - Tx_4, Ty_3 - Ty_4),$$

$$\vec{Lh} = (Tx_1 - Tx_4, Ty_1 - Ty_4)(tpxi, tpyi) =$$

$$(pxi * \vec{Lv} + Tx_4, pyi * \vec{Lh} + Ty_4) =$$

$$(px_i(Tx_3 - Tx_4) + pyi(Tx_1 - Tx_4) + Tx_4,$$

$$pxi(Ty_3 - Ty_4) + pyi(Ty_1 - Ty_4) + Ty_4)$$

As stated above, based on the relation between TRel and the saliency point position TFeaPnt of the object to be recognized, the relation between Rel and the saliency point position FeaPnt of the model, and the relation between TRel and Rel, the saliency point position TFeaPnt of the object to be recognized can be calculated from TRel and FeaPnt for each hypothesis Hi by using FuncFea.

(1-2-2) Integration of Saliency Points of Object to be Recognized in Plural Hypotheses In general, since an object with a position and pose different from the input image exists, and there is an influence of the noise of an image and a quantization error, plural hypotheses Hi are normally actually detected at shifted positions as well. In the method in which matching of partial patterns is integrated to make recognition as stated above, many votes are made to similar positions. FIG. 11-1103 shows the state. Further, FIG. 11-1103 shows positions of relative saliency point lines in which TFeaPnt for each hypothesis Hi is calculated in agreement with the detected position.

As stated above, since the same saliency point is positioned at almost the same place, the rough position of the saliency point can be obtained. Thus, the likely position of each saliency point can be estimated by statistically integrating the many hypotheses.

As methods used for the estimation, for example, the following methods are used.

In the first estimation method, it is assumed that the occurrence probabilities of all saliency points are the same, and an average value of all saliency point positions is used to obtain the estimated value.

For example, a saliency point estimated position Ei of the ith position of TFeaPnt of the jth hypothesis is calculated by mathematical expression 12.

[Mathematical Expression 12]

When the ith point of TFeaPnt of the jth hypothesis is made $(tp^j_{xi}, tp^j_{yi})$, $$E_i = (E_{xi}, E_{yi}) = \left( \frac{1}{k} \sum_{j=1}^{k} tp^j_{xi}, \frac{1}{k} \sum_{j=1}^{k} tp^j_{yi} \right)$$

In the second estimation method, a weighted average value is used while the similarity value of matching at the time of each vote is made the reliability.

In the third estimation method, in order to remove a large deviant value, robust estimation based on Least Median of Squares (LMedS) criteria can also be used.

This estimation method is not limited to the foregoing, and other methods may be used.

FIG. 11-1104 indicates estimated positions of saliency points, which are obtained by integration, by black circles.

(2) Applied Example

By this mechanism, the following also becomes possible.

Figure 12:
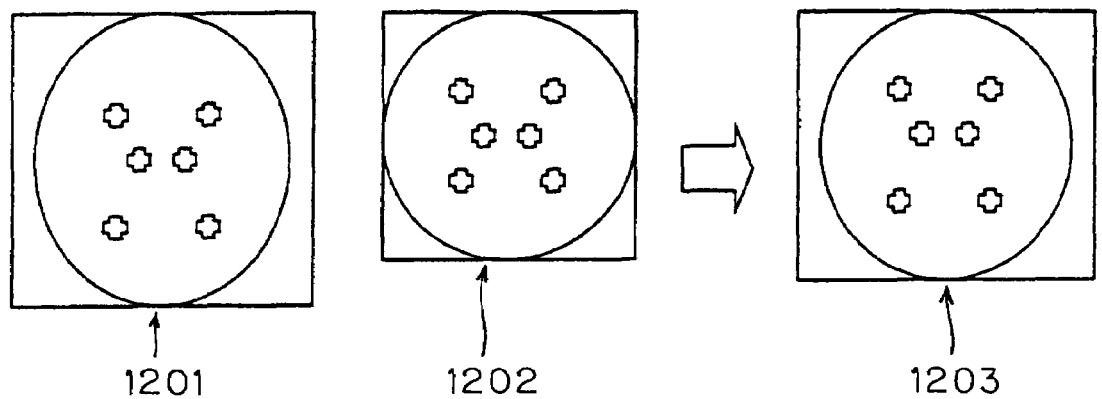
FIG. 12 is an explanatory view relating to estimation of saliency points of a face.

FIG. 12 shows an image in which in the case where a problem of performing face part detection is considered, six points of eyes, nostrils, and oral ends are made saliency points.

As models, it is assumed that only the model of Mr. A of FIG. 12-1201 and the model of Mr. B of FIG. 12-1202 are registered.

Here, a quite different image of Mr. C is inputted as an object to be recognized. In the case where the models of FIG. 12-1201 and FIG. 12-1202 are similar to the input image, the positions of the two saliency points are integrated to obtain estimated values, and the positions of the saliency points of Mr. C can be estimated.

As stated above, also to an object to be recognized which is not registered, it becomes possible to estimate the positions of saliency points by using a similar different model.

Besides, the image feature point and the saliency point do not necessarily correspond to each other, and the saliency point position can be calculated by the integration of the relative positions, and this suggests that a saliency point which is hard to find by normal feature point detection can be estimated. For example, consideration is given to a case where an attempt is made to find a position of a cheek of a person by image recognition. In general, since the human cheek has less texture, it is difficult to detect the cheek by feature point detection or pattern matching. However, when feature points (for example, eye, nose, mouth, etc.) around that and positions of saliency points to the regions are described by the method as described above, the position of the cheek can be derived from the detection of another feature point position. As described above, it becomes an effective method as a method of obtaining a position of an object which is hard to find in general.

(3) Judgment as to Whether Saliency Point Position is Correct

As described before, in general, a saliency point position exists at a place different from a feature point position. When it is possible to restrict that the saliency point position and the feature point position are identical to each other, the similarity of pattern matching at each feature point (saliency point) position can be used as reliability. However, in the estimation method, it is not judged whether the estimated saliency point position is correct.

Then, a pattern in the vicinity of the estimated saliency point position is separately cropped, the similarity is obtained by pattern matching to the registered pattern, and it may be judged whether each saliency point position is correct.

MODIFIED EXAMPLE

The present invention is not limited to the above embodiments, but may be variously changed within the scope not departing from the gist. Besides, within the scope not departing from the gist, the invention also includes contents in which elements described in different embodiments are combined, and contents in which an element is replaced by an element described in a different embodiment.

For example, with respect to the triangulation, a method of obtaining different triangulation, not the Delaunay triangulation, may be used. In general, in the procedure of generating a mesh, the Delaunay triangulation is generally divisions which do not overlap with each other and are disjoint to each other. However, according to circumstances, it may not be divisions which are disjoint to each other.

Besides, high-order Delaunay triangulation as the dual graph of high-order Voronoi tessellation may be used. In this case, although triangles overlap with each other, in this embodiment, since only the combination of three points is made an object, this problem does not arise.

Besides, in the high-order Delaunay triangulation, coupling to the nth closest point is considered, more complicated search becomes possible.

Besides, the Delaunay triangulation is used only for the registration or only for the recognition, while similarly to Japanese Patent Application Publication(KOKAI) No. JP-A-2003-242509, full search or search with restriction to the length of a basis vector may be performed. On the other hand, within the range of memory capacity, all combinations are contained at the time of registration, and the Delaunay triangulation may be used at the time of recognition.

What is claimed is:

1. An apparatus for recognizing an object by using an object image with a model, the apparatus comprising:

an image input unit configured to input the object image including the object to be recognized;

a feature point extraction unit configured to extract plural feature points of the object from the object image;

a triangulation unit configured to divide the object image into regions of plural triangles having vertices which are the plural feature points of the object or are vertices of a convex hull containing all the plural feature points of the object;

a feature point selection unit configured to select plural combinations of the feature points of the object, the each combination including three feature points, of the object, each corresponding to the each vertex of the each triangle;

a basis calculation unit configured to obtain, from each of the plural selected combinations of the three feature points of the object, two reference vectors for these feature points, and calculate each basis spanned by these two reference vectors, the each basis including plural basis vectors, the each basis vector including components that provide a coordinate system representing the positions of feature points of the object and positional relation among the feature points of the object;

a table memory unit configured to store a hash table data which associates a partial pattern of a model with an index parameter, the index parameter indicating a registration position of a partial pattern of the model in the hash table data, the index parameter including a parameter invariant to a geometric transformation;

an index calculating unit configured to calculate the index parameter of the partial pattern of the object based on the each basis;

an index retrieval unit configured to obtain the partial pattern of the model from the hash table data based on the index parameter of the partial pattern of the object; and a pattern similarity calculation unit to calculate a similarity between the obtained partial pattern of the model and the partial pattern of the object.

2. The apparatus according to claim 1, wherein:

the image input unit inputs a model image of a model to be registered to the hash table data;

the feature point extraction unit extracts plural feature points of the model from the model image;

the triangulation unit divides the model image into plural triangle regions having vertices which are the plural feature points of the model or vertices of a convex hull containing all the feature points of the model;

the feature point selection unit selects plural combinations of the feature points of the model, the each combination including three feature points, of the model, each corresponding to the each vertex of the each triangle;

the basis calculation unit obtains, from each of the selected plural combinations of three feature points of the model, two reference vectors for these feature points, and calculates each basis spanned by these two reference vectors, the each basis including plural basis vectors each including components indicating positions and a positional relation of the three feature points of the model of the each selected combination;

the partial pattern extraction unit extracts a partial pattern of the model from the model image based on the each basis of the model; and the index calculating unit calculates an index parameter of the partial pattern of the model based on the each basis of the model;

the apparatus further comprising:

an index determination-unit configured to determine a registration place of the hash table data based on the index parameter of a partial pattern of the model; and a table registration unit configured to register the partial pattern of the model to the determined registration place of the hash table data.

3. The apparatus according to claim 1, further comprising:

a hypothesis information generation unit configured to generate hypothesis information indicating an occurrence position of the object in the object image based on a similarity between the partial pattern of the object and the partial pattern of the model, and configured to vote the generated hypothesis information into a hypothesis space; and an object recognition unit configured to determine identification of the object, position of the object or pose of the object based on a voting score of the hypothesis information voted into the hypothesis space.

4. The apparatus according to claim 3, wherein the hypothesis information generation unit generates the hypothesis information further including the similarity between the partial pattern of the object and the partial pattern of the model belonging to the occurrence position of the object to be recognized in a retrieval place of the hash table data, votes the generated hypothesis information into a hypothesis vote box provided at each of the occurrence positions in the hypothesis space, and obtain the voting score at each of the occurrence positions by accumulating the similarity; and the object recognition unit recognizes the occurrence position where the voting score exceeds a threshold as an object position.

5. The apparatus according to claim 1, wherein the triangulation unit obtains the triangles by Delaunay triangulation.

6. The apparatus according to claim 1, wherein the triangulation unit obtains subsets of the plural feature points and obtains triangulation for each of the subsets.

7. The apparatus according to claim 1, wherein the feature point extraction unit varies a parameter of the feature point extraction to generate plural varieties of feature points, and the triangulation unit obtains subsets of the generated plural feature points and obtains triangulation for each of the subsets.

8. The apparatus according to claim 3, wherein the object recognition unit obtains positions of saliency points of the object based on relative position information of the respective saliency points of the model previously stored in the hash table data.

9. The apparatus according to claim 8, wherein the saliency point of the model is a point other than the feature point and includes position information.

10. The apparatus according to claim 8, wherein position information of the saliency point is included in the hypothesis information, and the position of the saliency point of the object is obtained for each piece of the hypothesis information.

11. The apparatus according to claim 8, wherein the positions of the saliency point of the object obtained for each piece of the hypothesis information are statistically integrated to obtain the saliency point of the one object.

12. A method for recognizing an object by using an object image with a model, the method being carried out by a computer, and the method comprising:
- inputting the object image including the object to be recognized;
- extracting plural feature points of the object from the object image;
- dividing the object image into regions of plural triangles having vertices which are the plural feature points of the object or are vertices of a convex hull containing all the plural feature points of the object;
- selecting plural combinations of the feature points of the object, the each combination including three feature points, of the object, each corresponding to the each vertex of the each triangle;
- obtaining, from each of the plural selected combinations of the three feature points of the object, two reference vectors for these feature points, and calculating each basis spanned by these two reference vectors, the each basis including plural basis vectors, the each basis vector including components that provide a coordinate system representing the positions of feature points of the object and positional relation among the feature points of the object;
- storing a hash table data which associates a partial pattern of a model with an index parameter, the index parameter indicating a registration position of a partial pattern of the model in the hash table data, the index parameter including a parameter invariant to a geometric transformation;
- calculating the index parameter of the partial pattern of the object based on the each basis;
- obtaining the partial pattern of the model from the hash table data based on the index parameter of the partial pattern of the object; and
- calculating a similarity between the obtained partial pattern of the model and the partial pattern of the object.

13. The method according to claim 12, further comprising:
- inputting a model image of a model which is to be registered to the hash table data;
- extracting plural feature points from the model image:
- dividing the image into regions of plural triangles having vertices which are the plural feature points or vertices of a convex hull containing all the feature points;
- selecting plural combinations of feature points existing at respective vertices of the respective triangles;
- obtaining, from the selected plural combinations of three feature points, two reference vectors for these feature points, and calculating bases each indicating positions and a positional relation of the feature points, each of the basis being spanned by these two reference vectors;
- determining a registration place of the hash table while an index parameter corresponding to a partial pattern of the model is made an index; and
- registering the partial pattern of the model to the determined registration place of the hash table.

14. The method according to claim 12, further comprising:
- generating hypothesis information indicating an occurrence position of the object in the object image based on a similarity between the partial pattern of the object and the partial pattern of the model;
- voting the generated hypothesis information into a hypothesis space; and
- determining identification of the object, position of the object or pose of the object based on a voting score of the hypothesis information voted into the hypothesis space.

15. The method according to claim 14, wherein:
- the hypothesis information includes the similarity of both the partial patterns belonging to the occurrence position of the object to be recognized in a retrieval place of the hash table data; and
- the generated hypothesis information is voted into a hypothesis vote box provided at each of the occurrence positions in the hypothesis space;
- the voting score at each of the occurrence positions is obtained; and
- the occurrence position where the voting score exceeds a threshold is recognized as an object position.

16. The method according to claim 12, wherein said dividing is made by Delaunay triangulation.

17. The method according to claim 15, wherein by said dividing, subsets of the plural feature points are obtained and triangulation is obtained for each of the subsets.

18. The method according to claim 15, wherein
- parameter of the feature point extraction is varied to generate plural varieties of the feature points;
- subsets of the generated plural feature points are obtained; and
- triangulation is obtained for each of the subsets.

19. A program product for recognizing an object by using an object image with a model,
the program product comprising instructions of:
- inputting a model image of a model which is to be registered to the hash table data;
- extracting plural feature points from the model image:
- dividing the image into regions of plural triangles having vertices which are the plural feature points or vertices of a convex hull containing all the feature points;
- selecting plural combinations of feature points existing at respective vertices of the respective triangles;
- obtaining, from the selected plural combinations of three feature points, two reference vectors for these feature points, and calculating bases each indicating positions and a positional relation of the feature points, each of the basis being spanned by these two reference vectors;
- determining a registration place of the hash table while an index parameter corresponding to a partial pattern of the model is made an index; and
- registering the partial pattern of the model to the determined registration place of the hash table.

* * * * *